April 21, 1936. O. BARNACK 2,038,261
COUPLING FOR DISTANCE METERS AND OBJECTIVES OF PHOTOGRAPHIC CAMERAS
Filed Aug. 22, 1932
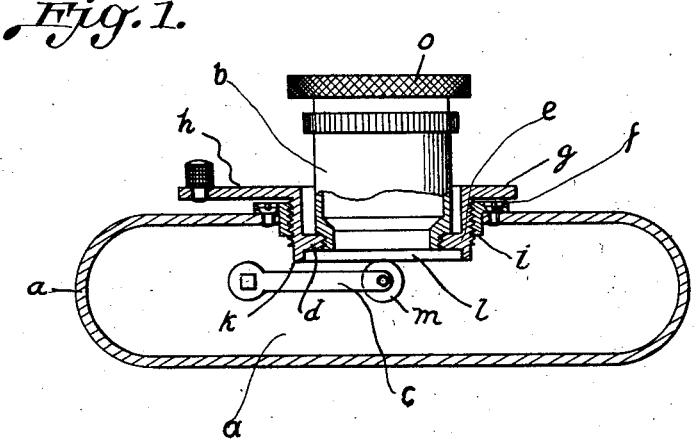
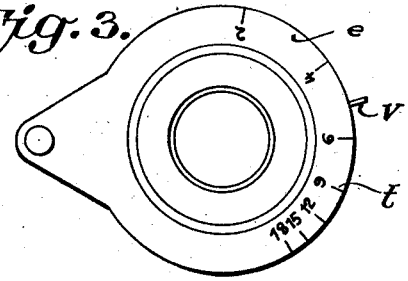
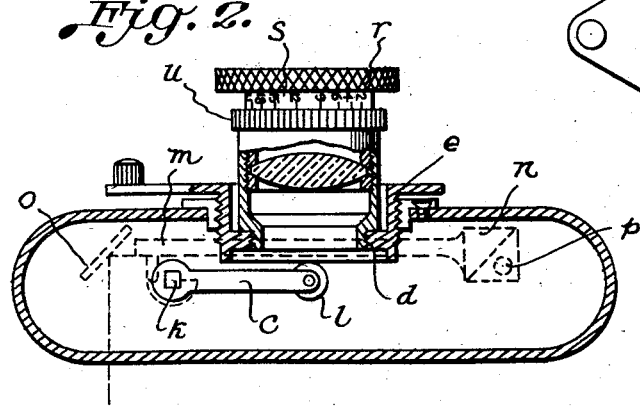
INVENTOR
Oskar Barnack
BY
Gerry C. Heinrich
ATTORNEY Patented Apr. 21, 1936

2,038,261

UNITED STATES PATENT OFFICE 2,038,261

COUPLING FOR DISTANCE METERS AND OBJECTIVES OF PHOTOGRAPHIC CAMERAS

Oskar Barnack, Wetzlar, Germany, assignor to Ernst Leitz, Optische Werke, G. m. b. H., Wetzlar, Germany Application August 22, 1932, Serial No. 629,763
In Germany October 17, 1931

3 Claims. (Cl. 95—44)

This invention relates to improvements in photographic cameras, particularly cameras, as they are for instance disclosed in my Patent No. 1,858,385 dated May 17, 1932, and in which a distance meter is coupled with the telescopic objective holder, and it is the principal object of my invention to provide in the front wall of the camera a specially constructed threaded sleeve which is adapted to receive and hold objectives of varying focal distances and to operate a lever connected with a mirrored distance meter.

Photographic cameras in which a distance meter is coupled with the telescopic objective frame or holder have the disadvantage that the objective focus changes if the normally adjusted or focused objective is exchanged for one having a different focus.

In order to overcome this disadvantage, according to my invention, a lever connected with a mirror distance meter engages the threaded sleeve of the camera and operates a reflection prism of the distance meter as soon as the sleeve is turned. If normally correctly focused objectives are properly adjusted for the correct distance and if for instance with a coincidence range finder both pictures coincide, the objective is correctly focused.

If, however, the objective is exchanged for one with different focus, the distance is measured in the manner customary with objectives of normal focus, the measured distance is then read from the scale on the margin of the sleeve and the objective is then adjusted to a number marked on the tube of the telescopic objective holder in order to effect the sharp focusing of the objective. The telescoping objective holder tube is then exchanged and forms with the objective a whole unit.

These and other objects and advantages of my invention will become more fully known as the description thereof proceeds, and will then be specifically defined in the appended claims.

In the accompanying drawing forming a material part of this disclosure:

Fig. 1 is a diagrammatic view of a camera shown in section equipped with a device constructed according to my invention.

Fig. 2 is a sectional plan view of a camera embodying my invention.

Fig. 3 is a front elevation of an objective ring.

As shown, the inner rim of the rotatable ring $e$ of the objective mounting is engaged by the roller $l$ of the telemeter. The lever $c$ carrying roller $l$ at one end, is pivoted at $k$ at its other end and turns about its pivot during the adjustment of the camera objective $r$ and its ring $e$ to impart its movement to the lever $m$ of the telemeter $n$, $o$ so that a rotation of the element of reflection or mirror $n$ about pivot $p$ is effected.

The exchange of the objectives is effected in the threaded element $d$ while the ring $e$ remains in the camera.

If the normal objective is exchanged for an objective of a different focus, in relation to ring $e$, this new objective has scale markings $s$ which gauge with scale $t$ on ring $e$. The member $r$ bearing the scale $s$ contains the optical system and is rotatable within the mounting $u$ after the adjustment of the telemeter corresponding to the measured distance. The front wall of the camera carries an index line $v$ for the reading of the measured distance.

It will be clear that with the above described construction it will be necessary to slightly adjust the objective system if other than normal or standard objectives are used properly after the adjustment of the telemeter.

The operation of the device will become entirely clear from the following explanation:

Principally this range finder is not designed for any particular focal length of an objective. The range finder has a base of a certain length, and this determines the angle of the rotation of the mirror which is required to cover the range from infinity to a certain minimum distance. This rotation of the mirror is accomplished by a lever mechanism through the rotation of the ring $e$, in the threaded mount having a definite pitch. The pitch of this thread will determine the width of the graduations of the scale $t$ on the ring, and the amount of forward motion as the ring rotates in its mount will depend on the base of the range finder as well as the length of the levers. It is quite possible to design this range finder so that through coincidence this forward motion of the ring in measuring distances from infinity to 3½ feet, could be equal to that required for the focusing of an objective of 50 mm. focal length, but this coincidence has really nothing to do with the actual principle of the matter. It is simply convenient that one type of objective can be used with this ring without any additional focusing scale on the objective mount.

Now let us assume that in order to cover the measuring range from infinity to 3½ feet, ring $e$ has to be advanced 2.34 mm. At the same time let us assume that if an objective of 50 mm. had originally been focused to infinity, and is now to be focused to 3½ feet, it must likewise be advanced 2.34 mm. In other words: an objective of 50 mm. could be screwed into the inside thread $d$ of the ring $e$ without the necessity of any additional focusing scale $s$ on the objective mount. Now the objective of 50 mm. is removed and is replaced by one of 70 mm. focal length. If this objective has to be focused at first to infinity and later on to 3½ feet, it would become necessary to advance it in the focusing mount as much as 4.6 mm. If this objective with its telescoping mount has been screwed into the thread $d$ of the ring $e$, and this ring has been advanced already 2.34 mm. so that coincidence prevails in the range finder, it would simply become necessary to arrange the graduation on the focusing mount of the objective in such manner that the figure 3.5 feet is opposite the index mark when the thread of this focusing mount of the objective holder has only advanced the lens system by an amount of 4.6 minus 2.34 or 2.26 mm.

In other words: The calibration $s$ on the telescoping objective mount simply considers the difference in the forward motion necessary to focus the objective and the forward motion already accomplished by the range finder.

It will be understood that I have described and shown the preferred form of my device only and that I may make such changes in the general arrangement and in the construction of the minor details of my invention, as come within the scope of the appended claims without departure from my invention, and the principles involved.

Having thus described my invention what I claim as new and desire to secure by Letters Patent is:

1. A photographic camera including a distance meter and an objective holder coupled therewith, said objective holder being rotatably engaged in the wall of the camera and axially movable for focusing upon rotation and comprising means for exchangeably holding interchangeable objective mounts, means for holding the objective holder to the camera, an objective mount having an objective adjustably carried therein for focusing, focusing of the objective being effected partly by movement of the objective holder and partly by movement of the objective in its mount.

2. In a camera having a telemeter, an objective, and its mounting, an adjusting member adapted to receive and hold various interchangeable objective mounts, a lever pivoted at one end, a roller at the opposite end engaging the said adjusting member during the adjustment of the objective mounting, a telemeter lever carrying an element of reflection and pivoted at one end adapted to be engaged by said first named lever to transmit the axial movement of the objective to the telemeter.

3. In cameras, having a telemeter and its operating lever, a graduated ring permanently engaged by the said lever to allow a determination of the distance found by said telemeter, said ring arranged for the reception of an objective.

OSKAR BARNACK.